US011692836B2

(12) United States Patent
Mathai et al.

(10) Patent No.: US 11,692,836 B2
(45) Date of Patent: Jul. 4, 2023

(54) VEHICLE SAFELY CALCULATOR

(71) Applicant: International Business Machines Corporation, Armonk, NY (US)

(72) Inventors: Shiju Mathai, Carrollton, TX (US); Jeff Edgington, Forth Worth, TX (US); Gregory Scott Jones, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 16/781,077

(22) Filed: Feb. 4, 2020

(65) Prior Publication Data
US 2021/0239478 A1 Aug. 5, 2021

(51) Int. Cl.
*G01C 21/34* (2006.01)
*G06F 16/27* (2019.01)
*G06Q 10/20* (2023.01)
*G01C 21/36* (2006.01)

(52) U.S. Cl.
CPC ..... *G01C 21/3461* (2013.01); *G01C 21/3697* (2013.01); *G06F 16/27* (2019.01); *G06Q 10/20* (2013.01)

(58) Field of Classification Search
CPC . G01C 21/3461; G01C 21/3697; G06F 16/27; G06Q 10/20
USPC .................................................. 701/29.1, 516
See application file for complete search history.

(56) References Cited

U.S. PATENT DOCUMENTS

| 5,797,134 | A | 8/1998 | McMillian et al. |
| 9,053,591 | B2 | 6/2015 | Phelan et al. |
| 9,130,930 | B2 | 9/2015 | Kennedy |
| 9,421,981 | B2 | 8/2016 | Phelan et al. |
| 9,952,600 | B2 | 4/2018 | Gurin |
| 10,319,167 | B1 * | 6/2019 | Oesterling ......... G07C 9/00896 |
| 10,360,518 | B2 | 7/2019 | Hirose et al. |

(Continued)

FOREIGN PATENT DOCUMENTS

| CN | 102308325 B | 1/2015 |
| CN | 106339916 A | 1/2017 |

(Continued)

OTHER PUBLICATIONS

"$CV—Twitter Search", Printed Nov. 26, 2019, 2 pages, <https://twitter.com/search?q=%24CV&src=ctag>.

(Continued)

*Primary Examiner* — Isaac G Smith
(74) *Attorney, Agent, or Firm* — Michael O'Keefe

(57) ABSTRACT

In an approach to assessing safety of a vehicle based on usage context, one or more computer processors receive a planned usage of a vehicle from a user. Based on the received planned usage, one or more computer processors determine a set of preferred vehicle characteristics. One or more computer processors retrieve a maintenance record and a usage history of a first vehicle. Based on the maintenance record and the usage history, one or more computer processors determine one or more vehicle characteristics of the first vehicle. Based on the set of preferred characteristics and the one or more vehicle characteristics of the first vehicle, one or more computer processors calculate a usage match score. One or more computer processors generate a risk assessment report.

14 Claims, 3 Drawing Sheets

(56) References Cited

U.S. PATENT DOCUMENTS

| | | | |
|---|---|---|---|
| 10,733,656 B1* | 8/2020 | Price | G06Q 30/0631 |
| 2017/0129335 A1 | 5/2017 | Lu et al. | |
| 2017/0186324 A1* | 6/2017 | Fish | G06Q 30/018 |
| 2017/0240110 A1 | 8/2017 | Lopez-Hinojosa et al. | |
| 2018/0091596 A1 | 3/2018 | Alvarez et al. | |
| 2018/0107935 A1 | 4/2018 | Jeon | |
| 2018/0322472 A1 | 11/2018 | Russell | |
| 2020/0011689 A1* | 1/2020 | Tatsumi | G01C 21/3641 |
| 2020/0051153 A1* | 2/2020 | Chrzan | G06Q 30/0282 |
| 2020/0164886 A1* | 5/2020 | Dutta | H04L 9/0643 |
| 2021/0149971 A1* | 5/2021 | Duan | G06N 3/084 |

FOREIGN PATENT DOCUMENTS

| | | |
|---|---|---|
| CN | 108431839 A | 8/2018 |
| JP | 2010128639 A | 6/2010 |
| KR | 100497128 B1 | 6/2005 |

OTHER PUBLICATIONS

"Brutski on Twitter: CV is CarFax on Steroids", Brutski on Twitter, Feb. 7, 2018, 1 page, <https://twitter.com/brutski/status/961401201853124609>.

IBM, "Driver Behavior", IBM Knowledge Center, Printed Nov. 26, 2019, 4 pages, <https://www.ibm.com/support/knowledgecenter/en/SSNQ4V_bas/iot-automotive/managing/driver_behavior/db_intro.html>.

* cited by examiner

VEHICLE SAFETY CALCULATOR

BACKGROUND OF THE INVENTION

The present invention relates generally to the field of data analytics, and more particularly to assessing safety of a vehicle based on usage context.

Modern motor vehicle systems are becoming increasingly computerized. Vehicle electronics are controlled partially or entirely by microprocessors (computers) networked both internally and externally. This architecture has been the basis for advances in safety, fuel efficiency, and convenience. There is a clear trend in industry to enable telematics in vehicles, with telematics broadly defined as the collection and use of telecommunications and information processing in internal or connected motor vehicle systems.

A blockchain is a decentralized and distributed digital ledger that can record transactions between two or more parties efficiently and in a verifiable and permanent way. The ledger itself can also be programmed to trigger transactions automatically. A blockchain maintains a continuously growing list of records, called blocks, secured from tampering and revision. Each block contains a timestamp and a link to a previous block. By design, blockchains are inherently resistant to modification of the data—once recorded, the data in a block cannot be altered retroactively. Using a peer-to-peer network and a distributed timestamping server, a blockchain database is managed autonomously. The decentralized consensus algorithm of blockchain technologies allows several entities to maintain a shared record of information without having to trust each other individually, since consensus is formed on a per-network basis. The networked model produces a system with the advantages of censorship resistance, tamper resistance, and a system with no single point of failure.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data.

SUMMARY

Embodiments of the present invention disclose a method, a computer program product, and a system for assessing safety of a vehicle based on usage context. The method may include one or more computer processors receiving a planned usage of a vehicle from a user. Based on the received planned usage, one or more computer processors determine a set of preferred vehicle characteristics. One or more computer processors retrieve a maintenance record and a usage history of a first vehicle. Based on the maintenance record and the usage history, one or more computer processors determine one or more vehicle characteristics of the first vehicle. Based on the set of preferred characteristics and the one or more vehicle characteristics of the first vehicle, one or more computer processors calculate a usage match score. One or more computer processors generate a risk assessment report.

DETAILED DESCRIPTION

When renting a vehicle, it may be difficult to know the quality or operating condition of the vehicle beforehand, which can have safety implications for the renter, passengers, and the public in general. Also, if available, the quality and safety information may influence the rental price of the vehicle in question, where two otherwise identical vehicles may have variances in rental rate based on relative operating conditions. Currently, there are technologies available to instrument and collect data about the way a vehicle is being driven, including speed, acceleration/deceleration, braking, telematic data, global positioning service (GPS) data, and road conditions, but this information is not being leveraged and combined with accident, maintenance, and repair information associated with the vehicle. There is a need for a system that takes into consideration, in addition to the history of the vehicle, a renter's planned routes, driving durations, driving ability, and personal vehicle concerns and providing the renter with an assessment and scoring of vehicles related to the renter's travel context, when presenting a renter with vehicles that are available to rent. Detailed information about the condition and history of multiple vehicles can enable the renter to make an informed decision about which vehicle is a better value and fit for their plans. As used herein, the term renter will apply to any user, or potential user, of a vehicle, whether the vehicle is a temporary use vehicle, a ride sharing vehicle, or a vehicle for sale.

Embodiments of the present invention recognize that the safety of a renter of a vehicle may be improved by providing a dynamically determined usage match score based on available data associated with a vehicle and factoring in the context in which the renter plans to use the vehicle. Embodiments of the present invention also recognize that efficiency of vehicle rental pricing may be gained by basing the pricing on a dynamically determined safety assessment. Implementation of embodiments of the invention may take a variety of forms, and exemplary implementation details are discussed subsequently with reference to the Figures.

Figure 1:
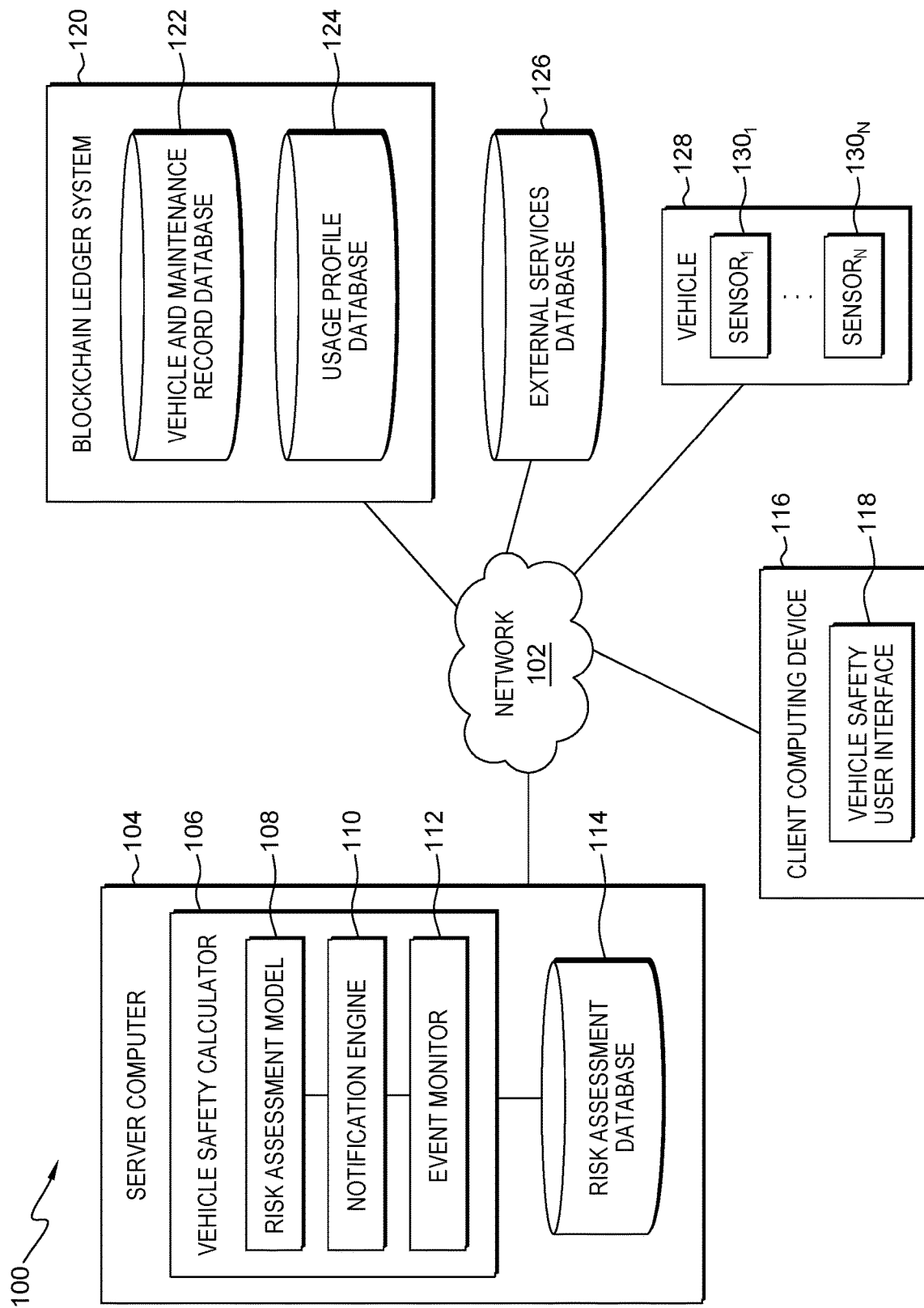
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 116, blockchain ledger system 120, external services database 126, and vehicle 128, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 116, blockchain ledger system 120, external services database 126, vehicle 128, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 116, blockchain ledger system 120, external services database 126, vehicle 128, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes vehicle safety calculator 106 and risk assessment database 114. Server computer 104 may include internal and external hardware components, as depicted and described in further detail with respect to FIG. 3.

Vehicle safety calculator 106 leverages available data associated with the safety of a vehicle with a renter's usage context to produce a risk assessment report to inform the renter of a usage match score prior to the renter's acceptance of the vehicle. Vehicle safety calculator 106 receives the planned usage profile of the vehicle from the renter. Based on the planned usage profile, vehicle safety calculator 106 determines a set of preferred vehicle characteristics. Vehicle safety calculator 106 retrieves the vehicle usage history and maintenance record, as well as available external services data associated with the vehicle. Based on the retrieved data, vehicle safety calculator 106 determines current vehicle characteristics and calculates a vehicle safety rating. Vehicle safety calculator 106 compares the current vehicle characteristics with the set of preferred characteristics and calculates a usage match score. Vehicle safety calculator 106 generates a vehicle risk assessment report and provides the report to the renter. After the renter returns the vehicle, vehicle safety calculator 106 receives post-usage feedback from the renter and stores the post-usage feedback with the previously generated risk assessment report. In the depicted embodiment, vehicle safety calculator 106 includes risk assessment model 108, notification engine 110, and event monitor 112. Vehicle safety calculator 106 is depicted and described in further detail with respect to FIG. 2.

In an embodiment, risk assessment model 108 is a cognitive model (i.e., recurrent neural network (RNN), deep stacking network (DSN), deep belief network (DBN), convolutional neural networks (CNN), compound hierarchical deep models, etc.) used by vehicle safety calculator 106 to perform the valuation of a vehicle based on usage context and vehicle history. Risk assessment model 108 uses the usage context of the renter to classify vehicular characteristics needed or preferred for a given trip. Risk assessment model 108 may use the renter's preferences to influence scoring, i.e., weighting or prioritizing, the various vehicular characteristics as the renter may have lesser or greater tolerances for risk, or my simply have concerns from which risk assessment model 108 can determine how to rank, score, and recommend a particular vehicle as compare to another. In an embodiment, risk assessment model 108 can capture patterns over time and reconcile the options that renters ultimately chose when the selection deviated from the recommendation. Risk assessment model 108 may also detect trends based on ratings of service providers, vehicle manufacturers, and parts manufacturers, which can indicate preferences for those entities. In one embodiment, risk assessment model 108 is a standalone component. In another embodiment, the function of risk assessment model 108 is integrated into vehicle safety calculator 106.

Notification engine 110 sends alerts and notifications associated with the vehicle itself and withe vehicle usage. For example, in an emergency, such as a vehicle crash, notification engine 110 can send alerts to police, fire, and emergency medical services based on owner and/or renter information stored in usage profile database 124. In another example, notification engine 110 can send a notification to an insurance company associated with the vehicle and/or renter regarding any damage to the vehicle. In a further example, notification engine 110 can send notifications to service providers or contractors for potential repair work. In yet another example, notification engine 110 can send an alert to the vehicle manufacturer, suggesting the manufacturer contact the vehicle owner regarding required recall repairs in the event that the owner is not aware. In one embodiment, notification engine 110 is configured and integrated with a business rules component (not shown), where the business rules define when notifications are needed and what information the notifications include. In the depicted embodiment, notification engine 110 is a standalone component. In another embodiment, the function of notification engine 110 is integrated into vehicle safety calculator 106.

Event monitor 112 constantly monitors, or "listens," for the detection of events that may impact the vehicle or vehicle usage safety. Event monitor 112 monitors a plurality of sensors and other data generators. For example, event monitor 112 may monitor weather forecasts, road conditions, accident reports, connected vehicle data, etc. In an embodiment, a service provider rating system may be a subcomponent of event monitor 112. The service provider rating system may collect data such as customer reviews from external systems, years of experience, certifications, registrations, number of jobs performed, etc. The service provider rating system may also retrieve modification records from blockchain ledger system 120 associated with the service provider. In another embodiment, a parts manufacturer rating system may be a subcomponent of event monitor 112. The parts manufacturer rating system may collect data such as pricing, reviews from external systems, years in business, warranty, repairs, etc. The parts manufacturer rating system may also retrieve modification records from blockchain ledger system 120 associated with the parts manufacturer. In an embodiment, event monitor 112 monitors social media triggers. For example, event monitor 112 may monitor one or more social media applications for a post that mentions a service provider, or a post that mentions the model of a vehicle, or a post that mentions a specific vehicle. In yet another embodiment, event monitor 112 may monitor the location of the vehicle. In the depicted embodiment, event monitor 112 is a standalone component. In another embodiment, the function of event monitor 112 is integrated into vehicle safety calculator 106.

Risk assessment database 114 is a repository for data used and generated by vehicle safety calculator 106. Risk assessment database 114 can represent one or more databases. In the depicted embodiment, risk assessment database 114 resides on server computer 104. In another embodiment, risk assessment database 114 may reside elsewhere within distributed data processing environment 100, provided vehicle safety calculator 106 has access to risk assessment database 114. A database is an organized collection of data. Risk assessment database 114 can be implemented with any type of storage device capable of storing data and configuration files that can be accessed and utilized by vehicle safety calculator 106, such as a database server, a hard disk drive, or a flash memory. Risk assessment database 114 stores risk assessment reports generated by vehicle safety calculator 106. Risk assessment database 114 may also store any post-usage feedback received by vehicle safety calculator 106. Risk assessment database 114 may also store data associated with a rating of a service provider, a vehicle manufacturer, and a parts manufacturer.

Client computing device 116 can be one or more of a laptop computer, a tablet computer, a smart phone, smart watch, a smart speaker, or any programmable electronic device capable of communicating with various components and devices within distributed data processing environment 100, via network 102. Client computing device 116 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 116 may be integrated into a vehicle of the user. For example, client computing device 116 may include a heads up display in the windshield of the vehicle. In general, client computing device 116 represents one or more programmable electronic devices or combination of programmable electronic devices capable of executing machine readable program instructions and communicating with other computing devices (not shown) within distributed data processing environment 100 via a network, such as network 102. Client computing device 116 includes an instance of vehicle safety user interface 118.

Vehicle safety user interface 118 provides an interface between vehicle safety calculator 106 on server computer 104 and a user of client computing device 116. In one embodiment, vehicle safety user interface 118 is mobile application software. Mobile application software, or an "app," is a computer program designed to run on smart phones, tablet computers and other mobile devices. In one embodiment, vehicle safety user interface 118 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Vehicle safety user interface 118 enables a user of client computing device 116 to input data regarding the usage of a vehicle. Vehicle safety user interface 118 may also enable a user of client computing device 116 to receive and view a risk assessment report generated by vehicle safety calculator 106.

Blockchain ledger system 120 is one or more of a plurality of systems known in the art which can be used to store records of digital value, for example, transactions, identities, assets, documents, and properties, into an immutable ledger, or to add self-enforcing business logic to the ledger, such as smart contracts. In one embodiment, blockchain ledger system 120 is permissionless, i.e., a public blockchain system open for participation to anyone. In another embodiment, blockchain ledger system 120 is permissioned, i.e., a private blockchain system available only to a closed group of participants. In the depicted embodiment, blockchain ledger system 120 resides outside of server computer 104. In another embodiment, blockchain ledger system 120 may reside on server computer 104 or elsewhere within distributed data processing environment 100, provided vehicle safety calculator 106 has access to blockchain ledger system 120. Blockchain ledger system 120 includes vehicle and maintenance record database 122 and usage profile database 124. Trustworthiness in renting, ride-sharing, or purchasing a vehicle is a concern for those using those vehicles. Blockchain tracking of all data related to a vehicle can be used to determine the safety, quality, and value of the vehicle. Vehicles benefiting from this information not only include personal automobiles, but also include business vehicles, motorcycles, watercraft, private airplanes, recreational vehicles, farm equipment, etc., and can be based on a unique identifier such as the Vehicle Identification Number (VIN).

Vehicle and maintenance record database 122 and usage profile database 124 are each a repository for data used by vehicle safety calculator 106. Vehicle and maintenance record database 122 and usage profile database 124 can each represent one or more databases. Vehicle and maintenance record database 122 and usage profile database 124 can each be implemented with any type of storage device capable of storing data and configuration files that can be accessed and utilized by vehicle safety calculator 106, such as a database server, a hard disk drive, or a flash memory. Beginning when a vehicle is manufactured, blockchain tracking of available data involved in the creation of the vehicle is important, for example, which options are included, manufacture dates, manufacture locations, overall luxury classification, safety and quality ratings of manufacturing teams and equipment involved at the time of manufacture, etc. Vehicle and maintenance record database 122 stores data associated with the manufacture and maintenance of one or more vehicles, such as vehicle 128. Such data may include, but is not limited to, dates of service, service provider details such as contact name, business name, address, phone number, etc., description of a repair or maintenance activity, a part number, a model number, an insurance claim number, a timestamp, an estimate of cost, an actual cost paid, details of an owner of the vehicle, a VIN, images of damage and repair, images of scanned documents, feedback, ratings, etc. After manufacture, the initial purchaser, then all owners, renters and users of a specific vehicle can impact the safety and working condition of the vehicle for those subsequently using the vehicle, thus blockchain tracking of the operators using the vehicle is useful. Furthermore, mileage, locations driven, traffic violations, accident details, telematic information from vehicle, i.e., speeds driven, braking frequency, etc., can provide additional measurement of the condition and safety of the vehicle after usage. Where and how a vehicle was operated can further determine the safety and quality of the vehicle for those subsequently using the vehicle. This travel information related to the vehicle, kept in the blockchain history, can indicate if a vehicle was operated in extreme conditions or in severe weather conditions if the operation dates are related back to historical weather data. For example, a vehicle operated in an area having frozen precipitation where road salt is used, could be more deteriorated than one operated in more ideal weather conditions. Usage profile database 124 stores data associated with the usage of a vehicle. Such data may include, but is not limited to, a VIN, dates of usage, vehicle usage history data such as telematic data and global positioning system (GPS) data, owner profile and history, rental history, accident history, insurance claims, weather data while vehicle was in use, etc. Usage profile database 124 may also store data associated with the user of a vehicle. Such data may include, but is not limited to, a driver profile, a driving record of a user, a demographic of the user, and the user's planned usage of the vehicle, including context, geospatial route, dates of usage, etc. In addition, usage profile database 124 may store a renter's preferences.

External services database 126 is a repository for data used by vehicle safety calculator 106. External services database 126 can represent one or more databases. External services database 126 resides within distributed data processing environment 100 such that vehicle safety calculator 106 has access to external services database 126. External services database 126 can be implemented with any type of storage device capable of storing data and configuration files that can be accessed and utilized by vehicle safety calculator 106, such as a database server, a hard disk drive, or a flash memory. External services database 126 stores data associated with one or more vehicles, for example, vehicle 128, from a plurality of external sources. The external sources may include, but are not limited to, an insurance company, a service provider, a buyer, a renter, a product manufacturer, a warranty company, a government agency, a rental company, and a social media service.

Vehicle 128 is one or more of a plurality of vehicles for which vehicle safety calculator 106 performs a risk assessment. Vehicle 128 can be any type of vehicle, including, but not limited to, an automobile, a truck, a bus, a boat, an airplane, a jet ski, a motorcycle, an all-terrain vehicle, a recreational vehicle, a snow mobile, a forklift, etc. Vehicle 128 can fall into a plurality of categories, such as commercial, personal, leisure, and utilization.

A sensor is a device that detects or measures a physical property, then records or otherwise responds to that property, such as vibration, chemicals, radio frequencies, environment, weather, humidity, light, etc. Sensor 1301-N, herein sensor(s) 130, detect a plurality of attributes of a vehicle 128 as well as the outside environment of vehicle 128. As used herein, N represents a positive integer, and accordingly a number of scenarios implemented in a given embodiment of the present invention is not limited to those depicted in FIG. 1. Sensor(s) 130 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, sensor(s) 130 include any device capable of imaging a portion of the electromagnetic spectrum. Sensor(s) 130 may be one or more of a plurality of types of microphone for detecting speech and other audible sounds, such as a car horn honking. Sensor(s) 130 may be able to detect weather conditions, such as air temperature, relative humidity, presence and type of precipitation, wind speed, etc., as user preferences may depend on the weather conditions. Sensor(s) 130 may be global positioning system (GPS) sensors. Sensor(s) 130 may be one or more of a plurality of types of telematic sensors integrated in vehicle 128. Telematic sensors may detect data related to the use of the vehicle, for example, mileage, speed, acceleration behavior, braking behavior, cornering behavior, road conditions, accessory usage, component failure, and any other data for which vehicle 128 is instrumented to collect.

The present invention may contain various accessible data sources, such as risk assessment database 114 and usage profile database 124, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Vehicle safety calculator 106 enables the authorized and secure processing of personal data. Vehicle safety calculator 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Vehicle safety calculator 106 provides information regarding personal data and the nature (e.g., type, scope, purpose, duration, etc.) of the processing. Vehicle safety calculator 106 provides the user with copies of stored personal data. Vehicle safety calculator 106 allows the correction or completion of incorrect or incomplete personal data. Vehicle safety calculator 106 allows the immediate deletion of personal data.

Figure 2:
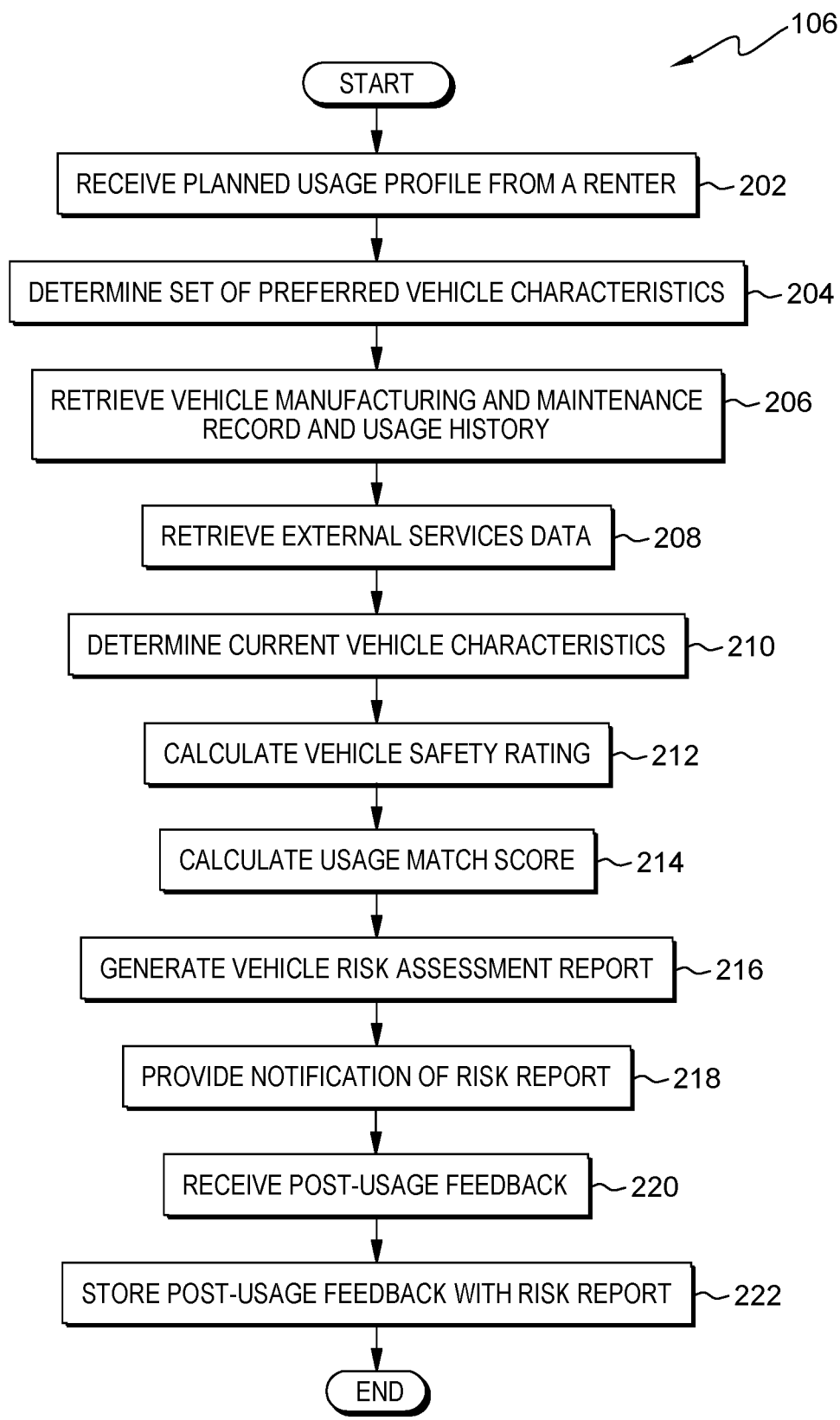
FIG. 2 is a flowchart depicting operational steps of a vehicle safety calculator, on a server computer within the distributed data processing environment of FIG. 1, for assessing safety of a vehicle based on usage context, in accordance with an embodiment of the present invention.

FIG. 2 is a flowchart depicting operational steps of vehicle safety calculator 106, on server computer 104 within distributed data processing environment 100 of FIG. 1, for assessing safety of a vehicle based on usage context, in accordance with an embodiment of the present invention.

The following is a scenario which describes a potential use for vehicle safety calculator 106. A renter that wants to rent a car from a rental agency is given the option between two available mid-size sedans with comparable features, mileage, year of manufacture, and overall luxury classification. The renter plans to use the car for a weekend trip along a scenic coastline. Although the sedans appear similar, the context of the rental usage provides additional criteria by which a decision can be made. Car 1 has roughly 30,000 miles and has been consistently rented to corporate customers who primarily drove the car in a city with moderate climate, e.g., temperatures that range between 50 and 75 degrees Fahrenheit year-round, that has congested traffic with only brief freeway usage and has had regular maintenance. Overall, car 1 is in ideal condition. Car 2 has been rented to a wide array of customers, including young drivers who tended to drive the car aggressively causing above-average wear-and-tear on the tire treads, braking systems, and transmission. Car 2 has been driven in a city with extreme climates, e.g., temperatures below 32 degrees Fahrenheit in the winter and above 80 degrees Fahrenheit in the summer. Furthermore, car 2 has been involved in a few minor accidents, and while the cosmetic damage has been fixed, the car's driving condition has been impacted by these incidents and repairs. Additionally, the rental agency saved money on maintenance of car 2 by allowing an unlicensed local auto-mechanic to utilize used-car-parts to do some of the repairs. If the renter had access to a risk assessment on each car backed by measurable and immutable data, the renter would prefer car 1 to drive along scenic, but potentially dangerous, coastal highways unless the renter received a deep discount for the "lower quality" car, i.e., car 2, and the renter is willing to modify planned driving behavior to account for a riskier vehicle. Vehicle safety calculator 106 provides a risk assessment regarding a rental vehicle by considering the planned usage profile as well as available data which characterizes the condition of the vehicle.

Vehicle safety calculator 106 receives a planned usage profile from a renter (step 202). Vehicle safety calculator 106 receives input from a renter via vehicle safety user interface 118. The planned usage profile of a renter can include the context of the usage, for example, the vehicle will be driven mostly on highways, or mostly in city traffic. The planned usage profile of a renter can also include the geospatial route to be taken, for example, through multiple intersections known for a high incidence of accidents. The planned usage profile of a renter can also include the demographics of the renter, for example, the renter's age or the renter's driving record. In addition, the planned usage profile of a renter can include the dates of usage, for example, during winter when bad road conditions are common. In addition to the planned usage profile, a renter may also specify preferences for a plurality of characteristics and features of the car. For example, the renter may specify a preference for a vehicle that has not been involved in any accidents. In an embodiment, the renter may specify a required safety rating. Vehicle safety calculator 106 may also request the renter to provide the renter's driver's license number, insurance information, phone number, and any other specific identifying or contact information into vehicle safety user interface 118. In an embodiment, vehicle safety calculator 106 stores the received planned usage profile and any additional received information in usage profile database 124.

Vehicle safety calculator 106 determines a set of preferred vehicle characteristics (step 204). Vehicle safety calculator 106 deconstructs the received planned usage into vehicle characteristics. For example, if the renter's planned usage profile indicates that the renter will be taking long drives along a winding, coastal highway, then vehicle safety calculator 106 determines preferred characteristics include good tire treads and good braking ability. In an embodiment, the set of preferred vehicle characteristics may include a preferred price range. In an embodiment, vehicle safety calculator 106 employs risk assessment model 108 to determine the set of preferred vehicle characteristics.

Vehicle safety calculator 106 retrieves manufacturing and maintenance records and vehicle usage history (step 206). In an embodiment, vehicle safety calculator 106 retrieves manufacturing and maintenance records from vehicle and maintenance record database 122. For example, vehicle safety calculator 106 may retrieve records indicating frequency, location, and ratings of service personnel responsible for scheduled or recommended maintenance which may indicate a level of maintenance performed. In another example, vehicle safety calculator 106 may retrieve records of repairs, including descriptions of parts replaced, quality and suppliers of parts, ratings of service personnel involved in the repair work, a determination of whether repairs are due to normal wear or accidents, plus details of accidents related to the repairs. In a further example, vehicle safety calculator 106 may retrieve vehicle inspection history and government registration which may indicate the responsibility of the owners and drivers of vehicles. In an embodiment, vehicle safety calculator 106 retrieves vehicle usage history from usage profile database 124. For example, vehicle safety calculator 106 may retrieve government records related to violations of vehicle use which may indicate the current quality of the vehicle, such as records of speeding tickets showing vehicle operated at excessive speeds which can generate more wear on a vehicle than one driven legally most of the time. In another example, vehicle safety calculator 106 may retrieve information associated with any accidents in which the vehicle was involved, including persons involved, VINs of other vehicles involved, location of accident occurrence, etc.

Vehicle safety calculator 106 retrieves external services data (step 208). In an embodiment, vehicle safety calculator 106 retrieves external service data from external services database 126. External services data may include a plurality of data, including ratings or feedback associated with the vehicle from one or more external sources. The external sources may include, but are not limited to, an insurance company, a service provider, a buyer, a renter, a product manufacturer, a warranty company, a government agency, a rental company, and a social media service. In an embodiment, vehicle safety calculator 106 utilizes one or more application program interfaces (API) to retrieve external services data. In an embodiment, vehicle safety calculator 106 stores the retrieved external services data in vehicle and maintenance record database 122 or usage profile database 124.

Vehicle safety calculator 106 determines current vehicle characteristics (step 210). As discussed with respect to step 204, vehicle safety calculator 106 breaks down the details of the retrieved manufacturing, maintenance, and usage history data to determine current characteristics of the vehicle. In an embodiment, vehicle safety calculator 106 determines the current characteristics that are the same as the previously determined set of preferred characteristics in order to perform a one to one comparison. For example, if the usage history indicates that the vehicle was driven in cities by non-aggressive drivers with a total mileage of 1000 miles, then vehicle safety calculator 106 determines that tire treads and braking systems are in excellent condition. In another example, if the usage history indicates that the vehicle was often driven during inclement winter weather in a location that salts the roads, then vehicle safety calculator 106 determines that various parts of the vehicle may be corroded, or in the process of corroding. In another embodiment, vehicle safety calculator 106 determines all vehicle characteristics that can be extracted from the information contained in the manufacturing, maintenance, and usage data. In an embodiment, vehicle safety calculator 106 employs risk assessment model 108 to determine the current vehicle characteristics.

Vehicle safety calculator 106 calculates a safety rating (step 212). Based on the retrieved data associated with the manufacturing, maintenance, and usage of the vehicle, vehicle safety calculator 106 calculates a safety rating for a vehicle. In an embodiment, vehicle safety calculator 106 utilizes data associated with the vehicle profile, including, but not limited to, repairs and enhancements performed on the vehicle, service providers, parts manufacturers, personnel that performed repairs, location repairs were made, fluid changes, i.e., oil, coolant, brake, and transmission, belt changes, battery changes, filter changes, etc. In an embodiment, vehicle safety calculator 106 utilizes data associated with renter or operator profiles, including, but not limited to, age, whether the user smokes tobacco, driving record, length of time the user operated the vehicle, any insurance or warranty data associated with the user, and any accident reports. In an embodiment, vehicle safety calculator 106 utilizes data associated with claims history, including, but not limited to, insurance claim details, warranty claim details, police reports indicating moving violations, rental agency damage reports, etc. In an embodiment, vehicle safety calculator 106 utilizes data associated with connected vehicle information, including, but not limited to, output of connected vehicle technologies, such as telematics, mileage, acceleration behavior, braking behavior, cornering behavior, GPS data, and any captured data associated with the road conditions while the vehicle was being driven. For example, vehicle safety calculator 106 can use data such as temperature extremes or the occurrence of flooding in the location where the vehicle was driven at the time the vehicle was driven to calculate a safety rating. In another example, vehicle safety calculator 106 can use data such as locations the vehicle was driven with poorly maintained roads that could impact wear of the suspension or where salt is used on the roads which could damage the under carriage of the vehicle to calculate a safety rating. In an embodiment, vehicle safety calculator 106 utilizes data associated with ratings of service providers, vehicle manufacturers, and parts manufacturers. The ratings data may have been retrieved from external services database 126, or retrieved from risk assessment database 114, or retrieved from both databases and combined. In an embodiment, vehicle safety calculator 106 uses an algorithm that applies a weight to each category of data used as it relates to the safety of the vehicle to calculate an overall safety rating. In an embodiment, applied weights are determined based on pre-defined business rules. In the embodiment, the pre-defined business rules may be based on preferences of the renter or of the rental agency. For example, a pre-defined business rule may state that any vehicle that has been in an accident should be given a low or negative weight to reduce the overall safety rating. In an embodiment, vehicle safety calculator 106 adds the determined safety rating to the previously determined current vehicle characteristics. In an embodiment, the rental agency may use the safety rating in a rental pricing algorithm, charging more for rentals of vehicles with high safety ratings. In an embodiment, vehicle safety calculator 106 employs risk assessment model 108 to calculate the safety rating. In an embodiment, the safety rating may be numerical, for example, a number between one and ten or a percentage. In another embodiment, the safety rating may be categorical, for example, low, medium, or high risk, or very safe, safe, or unsafe.

Vehicle safety calculator 106 calculates a usage match score (step 214). Vehicle safety calculator 106 compares the current vehicle characteristics with the determined set of preferred characteristics and calculates a usage match score. In an embodiment, vehicle safety calculator 106 uses pre-defined business rules to configure the weight given to each characteristic for a given activity. In an embodiment where vehicle safety calculator 106 uses risk assessment model 108 to calculate the usage match score, risk assessment model 108 uses machine learning over time to translate the planned usage profile into weights or priorities of the underlying characteristics. In an embodiment, vehicle safety calculator 106 uses renter preferences as inputs to influence the usage match score. For example, a renter may prefer a safety rating above a certain value, and vehicle safety calculator 106 uses the safety rating preference as part of the usage match score calculation. In an embodiment, the usage match score may be numerical, for example, a number between one and ten or a percentage. In another embodiment, the usage match may be categorical, for example, low, medium, or high, or close match, match, or no match.

Vehicle safety calculator 106 generates a vehicle risk assessment report (step 216). In an embodiment, vehicle safety calculator 106 generates a report for use by the renter or the rental agency, or both. The risk assessment report may include, but is not limited to, information such as the vehicle make and model, the current mileage of the vehicle, the typical previous usage of the vehicle, the planned usage, the safety rating, the usage match score, a recommendation, and a summary of the analysis on which the ratings are based. In an embodiment where vehicle safety calculator 106 compares more than one vehicle, vehicle safety calculator 106 creates a report that includes ranked recommendations of available vehicles based on the usage match score for each vehicle. In an embodiment, vehicle safety calculator 106 may determine a degree of compatibility between the planned usage profile and the vehicle safety rating. In the embodiment, if the degree of compatibility is below a pre-defined threshold, then vehicle safety calculator 106 may generate one or more recommended travel routes and vehicle usage instructions and include those in the vehicle risk assessment report. In various embodiments, vehicle safety calculator 106 constructs a document that contains the vehicle risk assessment report, for example, a downloadable document, a spreadsheet, an image, a graph, etc.

Vehicle safety calculator 106 provides notification of the vehicle risk assessment report (step 218). In an embodiment, vehicle safety calculator 106 provides the vehicle risk assessment report to the renter via vehicle safety user interface 118. In an embodiment, vehicle safety calculator 106 uses notification engine 110 to provide notification of the vehicle risk assessment report to the renter and/or the rental agency. Vehicle safety calculator 106 may provide notification of the vehicle risk assessment report as a text message, email, or other electronic document. The notification may include the entire report, portions of the report, and/or a link to view the vehicle risk assessment report on the website of the rental agency.

Vehicle safety calculator 106 receives post-usage feedback (step 220). In an embodiment, vehicle safety calculator 106 receives feedback from the renter following the rental experience via vehicle safety user interface 118. In an embodiment, vehicle safety calculator 106 sends a request to the renter for feedback. In another embodiment, the renter may choose to provide feedback without first receiving a request. The feedback may include a rating of the vehicle, a rating of the renter's experience with the vehicle, a rating of the accuracy of the usage match code, how the actual usage differed from the planned usage, etc.

Vehicle safety calculator 106 stores the post-usage feedback with the vehicle risk assessment report (step 222). In an embodiment, vehicle safety calculator 106 stores the received feedback in risk assessment database 114 in association with the corresponding risk assessment report. In the embodiment, risk assessment model 108 assesses the feedback in light of the recommendation to learn whether the recommendation had a positive outcome. As risk assessment model 108 generates more risk assessment reports and receives the corresponding feedback, risk assessment model 108 can detect patterns and refine recommendations to better suit the assessed risk and the renter's usage context.

Figure 3:
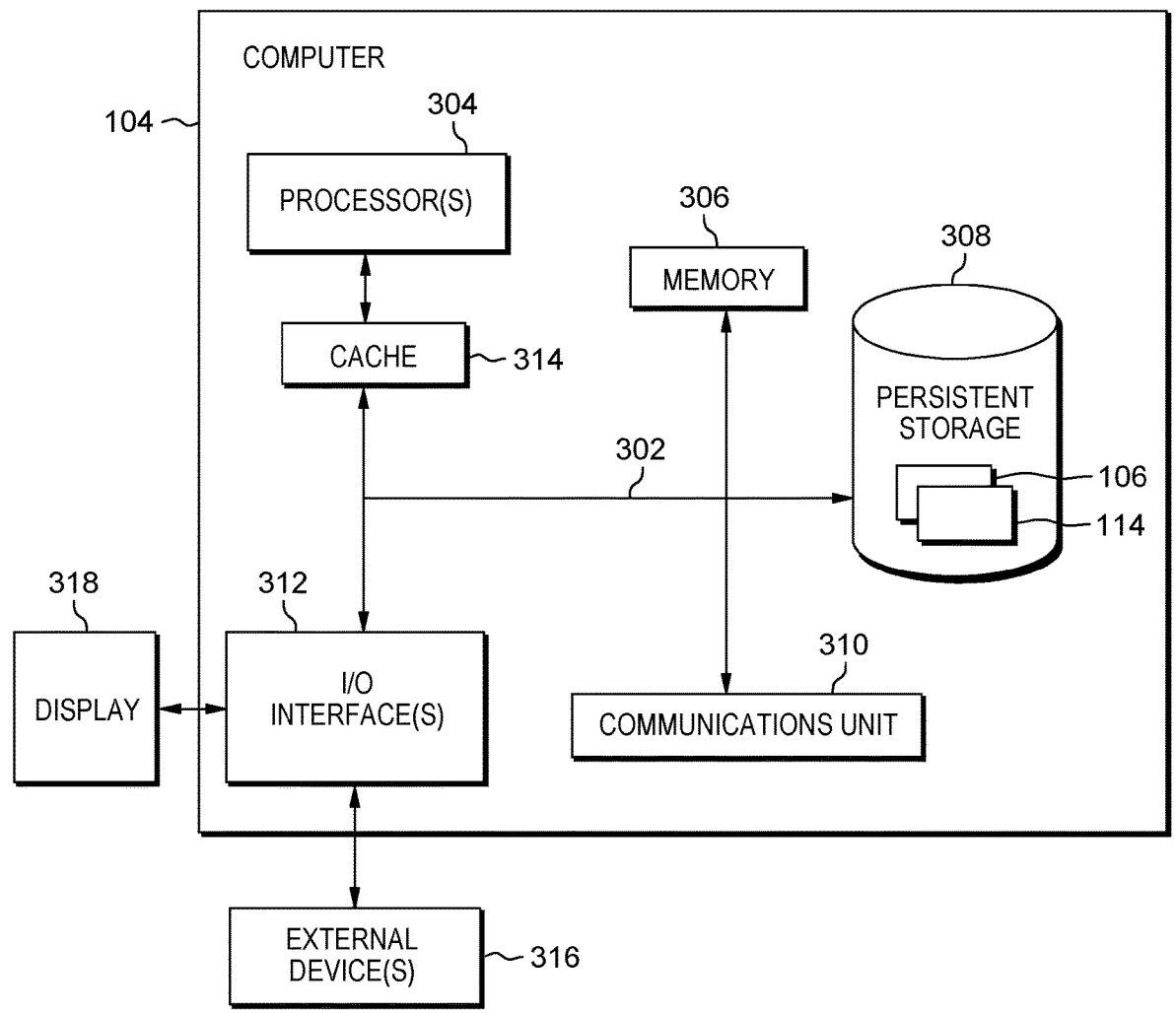
FIG. 3 depicts a block diagram of components of the server computer executing the vehicle safety calculator within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., vehicle safety calculator 106 and risk assessment database 114, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 116, blockchain ledger system 120, external services databases 126 and vehicle 128. In these examples, communications unit 310 includes one or more network interface cards. Communications unit 310 may provide communications through the use of either or both physical and wireless communications links. Vehicle safety calculator 106, risk assessment database 114, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., vehicle safety calculator 106 and risk assessment database 114 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:

receiving, by one or more computer processors, a planned usage profile of a user, wherein the planned usage profile is associated with a usage of a vehicle and includes a context of the usage of the vehicle and insurance information associated with the user;

based on the received planned usage profile, determining, by one or more computer processors, one or more preferred vehicle characteristics by classifying one or more vehicular characteristics needed for a given trip using a risk assessment model;

retrieving, by one or more computer processors, a maintenance record and a usage history of a first vehicle;

retrieving, by one or more computer processors, data associated with the first vehicle from one or more external sources, wherein the one or more external sources include a warranty company;

based on the maintenance record, the usage history, and the data associated with the first vehicle from the one or more external sources, determining, by one or more computer processors, using the risk assessment model, one or more current vehicle characteristics of the first vehicle, wherein at least one of the one or more current vehicle characteristics corresponds to a same category of data as at least one of the one or more preferred vehicle characteristics;

performing, by the one or more computer processors, a one to one comparison of each of the one or more preferred vehicle characteristics to the one or more corresponding current vehicle characteristics;

based on the one to one comparison, calculating, by the one or more computer processors, a weighted usage match score, wherein each of the one or more preferred vehicle characteristics is assigned a weight based on one or more pre-defined business rules;

based on the maintenance record, the usage history of the first vehicle, and the data associated with the first vehicle from the one or more external sources, calculating, by the one or more computer processors, a safety rating of the vehicle;

generating, by one or more computer processors, a risk assessment report, wherein the risk assessment includes the safety rating and the weighted usage match score;

displaying, by one or more computer processors, via a user interface, a link to view the vehicle risk assessment report on a website;

receiving, by one or more computer processors, feedback from the user associated with using the first vehicle via the link in the user interface; and training, by one or more computer processors, the risk assessment model with the risk assessment report and the associated feedback.

2. The method of claim 1,
wherein the one or more external sources include an insurance company, a buyer, a renter, a product manufacturer, and a rental company.

3. The method of claim 1, further comprising:
storing, by the one or more computer processors, the feedback in association with the risk assessment report.

4. The method of claim 1, wherein the planned usage profile is selected from the group consisting of: geospatial route, dates of vehicle usage, vehicle characteristic preferences, vehicle feature preferences, age of the user, driving record of the user, a required safety rating of a vehicle, a driver's license number, demographics of the user, and a phone number associated with the user.

5. The method of claim 1, wherein the maintenance record of the first vehicle includes data selected from the group consisting of: a frequency of maintenance repairs, a location of the maintenance repairs, a date of the maintenance repairs, a description of service personnel responsible for the maintenance repairs, a rating of service personnel responsible for the maintenance repairs, a description of parts replaced, a supplier of parts replaced, a determination of whether repairs are due to normal wear or accidents, a detail of an accident related to a repair, a vehicle inspection history, a government registration history, a part number, a model number, an insurance claim number, a timestamp, an estimate of cost, an actual cost paid, a detail of an owner of the vehicle, a vehicle identification number, an image of damage, an image of repair, an image of a scanned document, feedback, an initial purchaser of the first vehicle, an owner of the first vehicle, a renter of the first vehicle, a mileage, a location driven, telematic information of the first vehicle, a speed driven, an acceleration behavior, a braking behavior, a cornering behavior, a road condition, an accessory usage, and a component failure.

6. The method of claim 1, wherein the usage history of the first vehicle includes data selected from the group consisting of: a vehicle identification number, a date of usage, telematic data, global positioning system (GPS) data, an owner profile, an owner history, a rental history, an insurance claims, data associated with weather conditions during usage of the first vehicle, a government record related to a violation associated with a use of the first vehicle, information associated with an accident in which the first vehicle was involved, persons involved in the accident associated with the first vehicle, a vehicle identification number of another vehicle involved in the accident associated with the first vehicle, and a location of accident occurrence.

7. The method of claim 1, wherein the maintenance record and the usage history of a first vehicle are retrieved from a blockchain ledger system.

8. A computer program product, the computer program product comprising:
one or more computer readable storage media and program instructions collectively stored on the one or more computer readable storage media, the stored program instructions comprising:

program instructions to receive a planned usage profile of a user, wherein the planned usage profile is associated with a usage of a vehicle and includes a context of the usage of the vehicle and insurance information associated with the user;

based on the received planned usage profile, program instructions to determine one or more preferred vehicle characteristics by classifying one or more vehicular characteristics needed for a given trip using a risk assessment model;

program instructions to retrieve a maintenance record and a usage history of a first vehicle;

program instructions to retrieve data associated with the first vehicle from one or more external sources, wherein the one or more external sources include a government agency;

based on the maintenance record, the usage history, and the data associated with the first vehicle from the one or more external sources, program instructions to determine, using the risk assessment model, one or more current vehicle characteristics of the first vehicle, wherein at least one of the one or more current vehicle characteristics corresponds to a same category of data as at least one of the one or more preferred vehicle characteristics;

program instructions to perform a one to one comparison of each of the one or more preferred vehicle characteristics to the one or more corresponding current vehicle characteristics;

based on the one to one comparison, program instructions to calculate a weighted usage match score, wherein each of the one or more preferred vehicle characteristics is assigned a weight based on one or more pre-defined business rules;

based on the maintenance record, the usage history of the first vehicle, and the data associated with the first vehicle from the one or more external sources, program instructions to calculate a safety rating of the vehicle;

program instructions to generate a risk assessment report, wherein the risk assessment includes the safety rating and the weighted usage match score;

program instructions to display, via a user interface, a link to view the vehicle risk assessment report on a website;

program instructions to receive feedback from the user associated with using the first vehicle via the link in the user interface; and program instructions to train the risk assessment model with the risk assessment report and the associated feedback.

9. The computer program product of claim 8, wherein the one or more external sources include an insurance company, a buyer, a renter, a product manufacturer, and a rental company.

10. The computer program product of claim 8, the stored program instructions further comprising:

program instructions to receive feedback from a user associated with using the first vehicle; and program instructions to store the feedback in association with the risk assessment report.

11. The computer program product of claim 8, wherein the maintenance record and the usage history of a first vehicle are retrieved from a blockchain ledger system.

12. A computer system, the computer system comprising:

one or more computer processors;

one or more computer readable storage media;

program instructions collectively stored on the one or more computer readable storage media for execution by at least one of the one or more computer processors, the stored program instructions comprising:

program instructions to receive a planned usage profile of a user, wherein the planned usage profile is associated with a usage of a vehicle and includes a context of the usage of the vehicle and insurance information associated with the user;

based on the received planned usage profile, program instructions to determine one or more preferred vehicle characteristics by classifying one or more vehicular characteristics needed for a given trip using a risk assessment model;

program instructions to retrieve a maintenance record and a usage history of a first vehicle;

program instructions to retrieve data associated with the first vehicle from one or more external sources, wherein the one or more external sources include a social media service;

based on the maintenance record, the usage history, and the data associated with the first vehicle from the one or more external sources, program instructions to determine, using the risk assessment model, one or more current vehicle characteristics of the first vehicle, wherein at least one of the one or more current vehicle characteristics corresponds to a same category of data as at least one of the one or more preferred vehicle characteristics;

program instructions to perform a one to one comparison of each of the one or more preferred vehicle characteristics to the one or more corresponding current vehicle characteristics;

based on the one to one comparison, program instructions to calculate a weighted usage match score, wherein each of the one or more preferred vehicle characteristics is assigned a weight based on one or more predefined business rules;

based on the maintenance record, the usage history of the first vehicle, and the data associated with the first vehicle from the one or more external sources, program instructions to calculate a safety rating of the vehicle;

program instructions to generate a risk assessment report, wherein the risk assessment includes the safety rating and the weighted usage match score;

program instructions to display, via a user interface, a link to view the vehicle risk assessment report on a website;

program instructions to receive feedback from the user associated with using the first vehicle via the link in the user interface; and program instructions to train the risk assessment model with the risk assessment report and the associated feedback.

13. The computer system of claim 12, the stored program instructions further comprising:

program instructions to receive feedback from a user associated with using the first vehicle; and program instructions to store the feedback in association with the risk assessment report.

14. The computer system of claim 12, wherein the maintenance record and the usage history of a first vehicle are retrieved from a blockchain ledger system.

* * * * *